US008433667B2

(12) United States Patent
Mahajan et al.

(10) Patent No.: US 8,433,667 B2
(45) Date of Patent: Apr. 30, 2013

(54) EMBEDDED REACTIVE AND PROACTIVE INTELLIGENCE

(75) Inventors: Pallavi Mahajan, Ghaziabad (IN);
Philip A. Shafer, Raleigh, NC (US);
Robert P. Enns, Los Gatos, CA (US);
Daniel Kharitonov, Palo Alto, CA (US);
Dogu Narin, Sunnyvale, CA (US); **M.
Richard Salaiz**, Oakland, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 881 days.

(21) Appl. No.: 11/840,520

(22) Filed: Aug. 17, 2007

(65) Prior Publication Data

US 2009/0048995 A1 Feb. 19, 2009

(51) Int. Cl.
*G06N 5/00* (2006.01)
(52) U.S. Cl.
USPC ............................................. 706/46; 706/45
(58) Field of Classification Search .................... 706/46, 706/45
See application file for complete search history.

(56) References Cited

U.S. PATENT DOCUMENTS

2002/0143908 A1 10/2002 Taggart et al.
2004/0078695 A1 4/2004 Bowers et al.

FOREIGN PATENT DOCUMENTS

WO WO 98/24222 6/1998
WO WO 00/72183 A2 11/2000

OTHER PUBLICATIONS

Ong, et al, Web-Based Fault Diagnostic and Learning System, The International Journal of Advanced Manufacturing Technology, vol. 18, No. 7, Oct. 2001, pp. 502-511.*
Ong, et al., Web-Based Fault Diagnostic and Learning System, The International Journal of Advanced Manufacturing Technology, vol. 18, No. 7, Oct. 2001, pp. 502-511.*
Vincent, et al., AI Solutions for MDS: Artificial Intelligence Techniques for Misuse Detection and Localisation in Telecommunication Environments. Technical Report. EC., 2006, pp. 1-111.*
Utton, Distributed Negotiation for Fault Diagnosis in the Connected Home, Doctoral Thesis, Queen Mary, University of London, Department of Electronic Engineering, Aug. 2006, pp. 1-201.*
European Search Report issued in corresponding European application No. EP 08 25 2716, mailed Dec. 5, 2008, 13 pages.

* cited by examiner

*Primary Examiner* — Wilbert L Starks
(74) *Attorney, Agent, or Firm* — Harrity & Harrity, LLP (57) ABSTRACT

A network device may include logic configured to invoke proactive programs based on the expiration of a long time period within the network device, wherein the proactive programs collect data relating to operations of the network device, invoke reactive programs based on the detection of at least one of an event or expiration of a short time period, wherein the reactive programs collect, correlate and analyze data relating to the detected event or expiration of a short time period, determine a corrective action based on collected and analyzed data, and perform the determined corrective action within the network device.

19 Claims, 7 Drawing Sheets

EMBEDDED REACTIVE AND PROACTIVE INTELLIGENCE

BACKGROUND INFORMATION

Event detection and management systems are typically programmed with conditions, that when satisfied, generate errors within a device. Existing systems that detect errors can send a message to a remote location. These messages do not provide adequate information or procedures to fix errors within the device. Further, existing systems wait for error conditions to occur before taking actions relating to the error corrections.

SUMMARY

According to one aspect, a network device is provided. The network device may comprise logic configured to: invoke proactive programs based on the expiration of a long time period within the network device, wherein the proactive programs collect and transmit data relating to successful operations of the network device; invoke reactive programs based on the detection of at least one of an event or expiration of a short time period, wherein the reactive programs collect and analyze data relating to the detected event or expiration of the short time period; determine a corrective action based on collected and analyzed data; and perform the determined corrective action within the network device.

According to another aspect, a method is provided. The method may comprise detecting and/or correlating at least one of a plurality of events or a plurality of time periods within a network device; invoking a program in response to the detected event or time period; collecting data received from the invoked program; analyzing collected data to determine a corrective action; and performing the determined corrective action within the network device.

According to another aspect, a network device may comprise means for determining a plurality of time periods within the network device; means for detecting a plurality of events within a network device; means for invoking a program in response to one of the plurality of determined time periods or detected events; means for collecting data received from the invoked program; means for analyzing collected data; and means for performing corrective actions within the network device based on the analyzed data.

DETAILED DESCRIPTION OF PREFERRED EMBODIMENTS

The following detailed description refers to the accompanying drawings. The same reference numbers in different drawings may identify the same or similar elements. In addition, while some of the following description is provided mainly in the context of routers or other network elements at layer 2 and/or layer 3 of the Open Systems Interconnection (OSI) Model, the principles and teachings may be applied to different types of network devices at different layers of communication (e.g., a Multi-protocol label switching (MPLS) routers, a Synchronous Optical Network (SONET) add-drop multiplexers, a Gigabit Passive Optical network (GPONs) switches, a Synchronous Digital Hierarchy (SDH) network elements, etc.).

Figure 1:
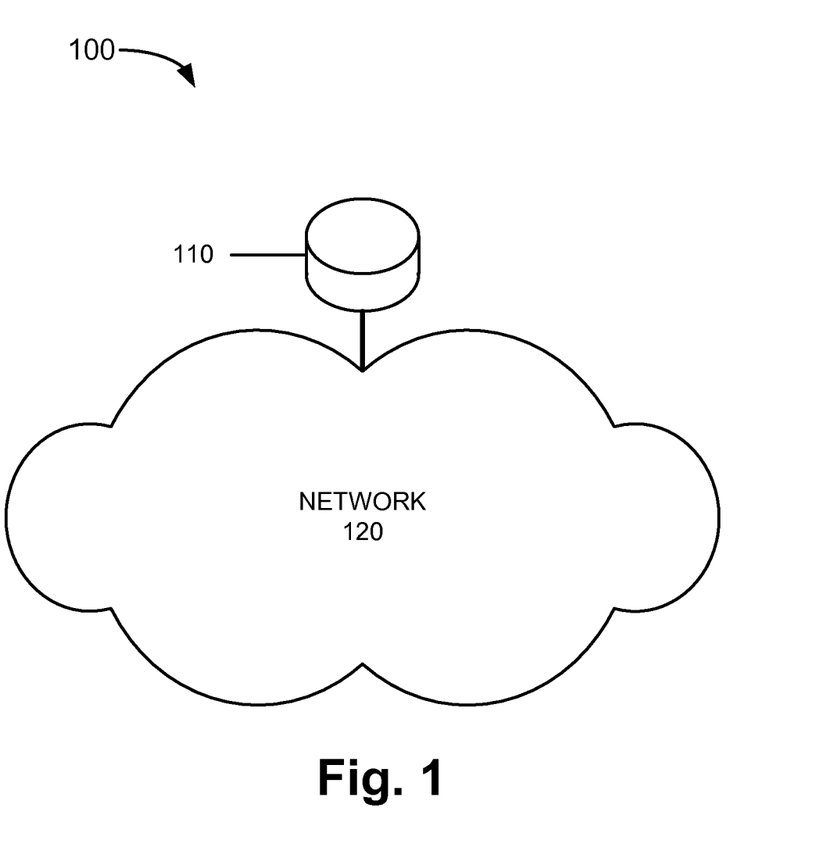
FIG. 1 shows a network in which concepts described herein may be implemented.

FIG. 1 shows an exemplary network in which concepts described herein may be implemented. As shown, network 100 may include network element 110 and a network 120. In practice, network 100 may include additional elements than those illustrated in FIG. 1. Network element 110 may include devices for performing network-related functions, such as a router or a switch (e.g., a provider edge (PE) router in a MPLS network). Network 120 may include the Internet, an ad hoc network, a local area network (LAN), a wide area network (WAN), a metropolitan area network (MAN), a cellular network, a public switched telephone network (PSTN), any other network, or a combination of networks. Network element 110 may communicate with other network elements in network 120 through a wired or wireless communication link.

Figure 2:
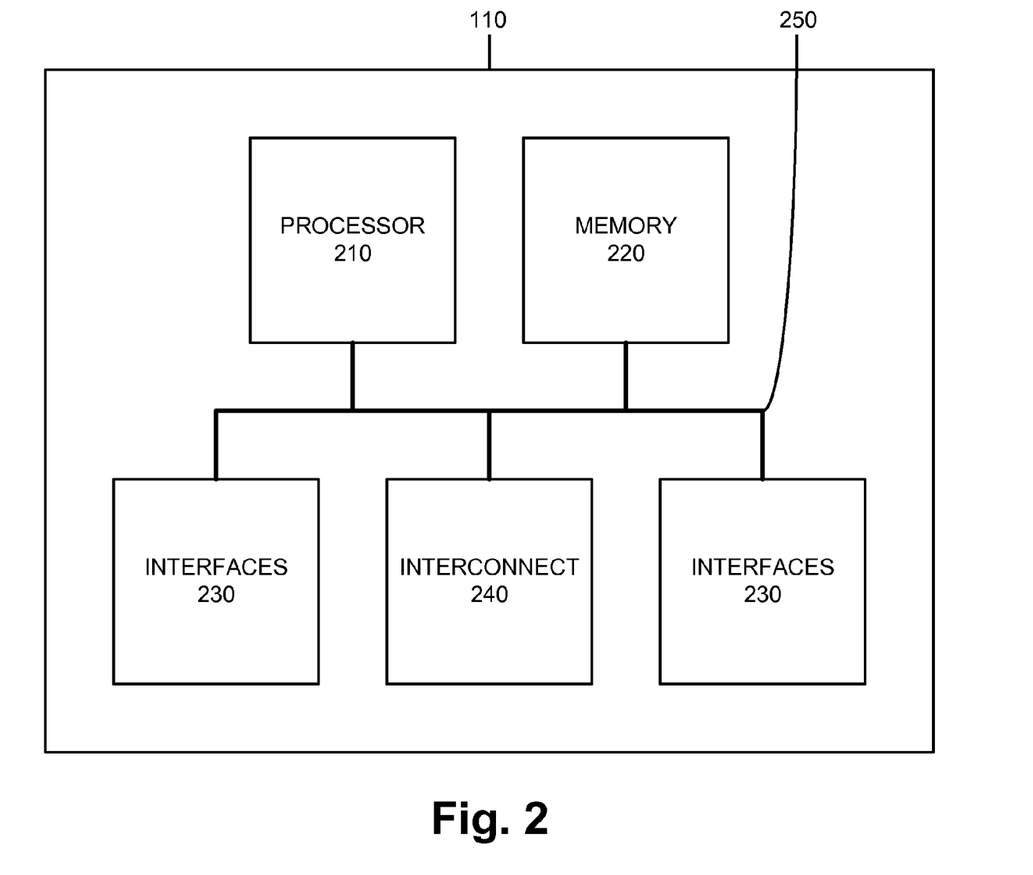
FIG. 2 is a block diagram of an exemplary device of FIG. 1.

FIG. 2 shows an exemplary block diagram of network element 110. As shown, network element 110 may include a processor 210, memory 220, interfaces 230, an interconnect 240, and a bus 250. In other implementations, network element 110 may include fewer, additional, or different components than those illustrated in FIG. 2.

Processor 210 may include one or more processors, microprocessors, application specific integrated circuits (ASICs), field programming gate arrays (FPGAs), and/or processing logic optimized for networking and communications. Memory 220 may include static memory, such as read only memory (ROM), dynamic memory, such as random access memory (RAM), and/or onboard cache, for storing data and machine-readable instructions. Memory 220 may also include storage devices, such as a floppy disk, a CD ROM, a CD read/write (R/W) disc, and/or flash memory, as well as other types of storage devices. Interfaces 230 may include devices for receiving incoming data stream from networks and for transmitting data to networks (e.g., Ethernet card, optical carrier (OC) interfaces, asynchronous transfer mode (ATM) interfaces, etc.). Interconnect 240 may include one or more switches or switch fabrics for directing incoming network traffic from one or more of interfaces 230 to others of interfaces 230. Bus 250 may include a path that permits communication among processor 210, memory 220, interfaces 230, and/or interconnects 240.

Depending on implementation, the components that are shown in FIG. 2 may provide fewer or additional functionalities. For example, if network element 110 performs an Internet Protocol (IP) packet routing function as part of a MPLS router, processor 210 may perform tasks associated with obtaining routing information from other routers in a MPLS network. In such cases, conveying network traffic from one interface to another may involve label based routing, rather than IP address based routing.

Figure 3:
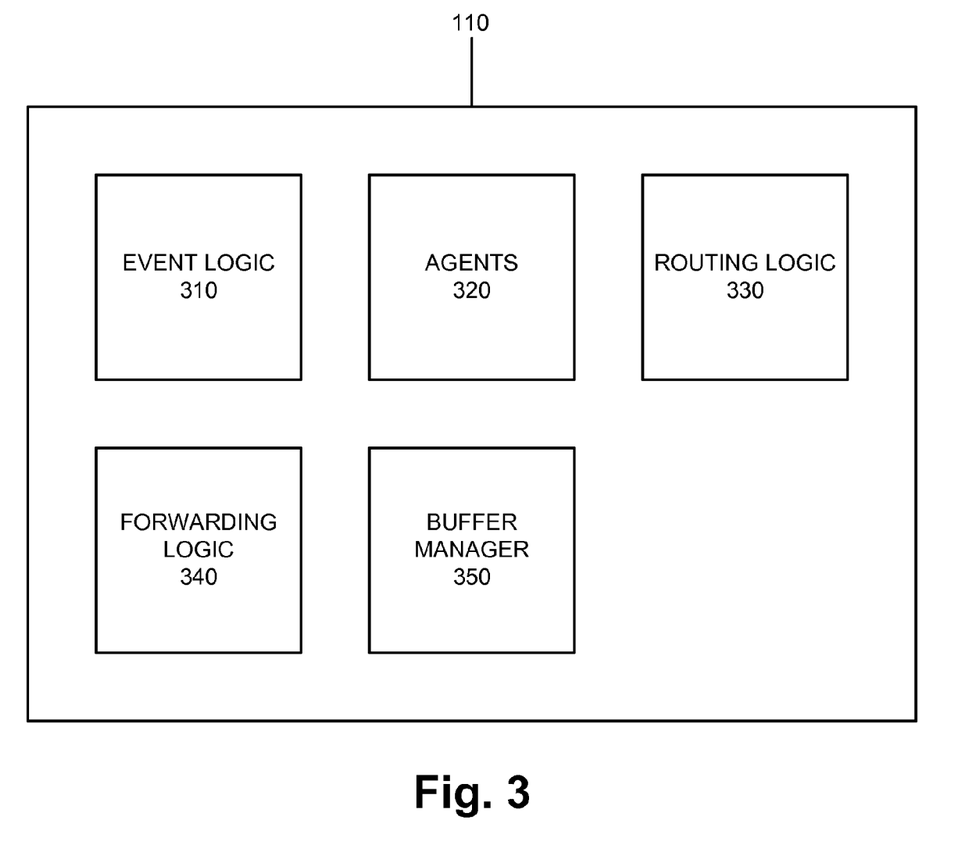
FIG. 3 is a functional block diagram of the device of FIG. 1.

FIG. 3 is a functional block diagram of a network element 110 that includes a router. As shown, network element 110 may include event logic 310, agents 320, routing logic 330, forwarding logic 340, and packet buffering logic 350. In different implementations, network element 110 may include fewer, additional, or different components than those illustrated in FIG. 3. For example, network element 110 may or may not provide certain network management functions, and in such instances, network element 110 may not include certain agents 330.

Event logic 310 may include hardware and/or software for performing various event driven functions for management and operation of network element 110 and/or other network elements. For example, event logic 310 may provide embedded reactive and proactive scripts used to collect and analyze data to monitor performance within network element 110. Event logic 310 may further provide correlation of events and time periods, and in response to the analysis of correlated events/time periods, make decisions to reconfigure operations of network element 110. Event logic may also create new scripts to perform further collection and analysis of data within network element 110. In another example, event logic 310 may provide a user interface via which a network administrator or a user can interact with network element 110 and receive problem report bundles that may include data relating to errors and/or corrective actions taken within network element 110. A functional block diagram of the components of event logic 310 is shown in FIG. 4.

Agents 320 may include hardware and/or software for monitoring and/or controlling components on behalf of event logic 310. The monitored components may include a physical device (e.g., a plug-in card, a multiplexer, a switch, etc.) or a logical device, such as a virtual connection or a logical interface. In monitoring the components, agent 320 may detect a fault or a recovery of an interface, an interconnect, or any other component of network element 110 and may report the fault or the recovery to event logic 310. For example, agents 320 may detect a failure of one of interfaces 230 and may send associated alarm or error messages to event logic 310. In another example, agents 320 may receive commands from a remote device and may make appropriate configuration changes to interfaces 230. In some implementations, agents 320 may be attached or connected to other subcomponents of network element 110.

Routing logic 330 may include hardware and/or software for communicating with other routers to gather and store routing information in a routing information base (RIB). Forwarding logic 340 may include hardware and/or software for directing a packet to a proper output port on one of interfaces 230 based on routing information in the RIB. Buffer manager 350 may provide a buffer for queuing incoming packets. If packets arrive simultaneously, one or more of the packets may be stored in the buffer until higher priority packets are processed and/or transmitted.

Figure 4:
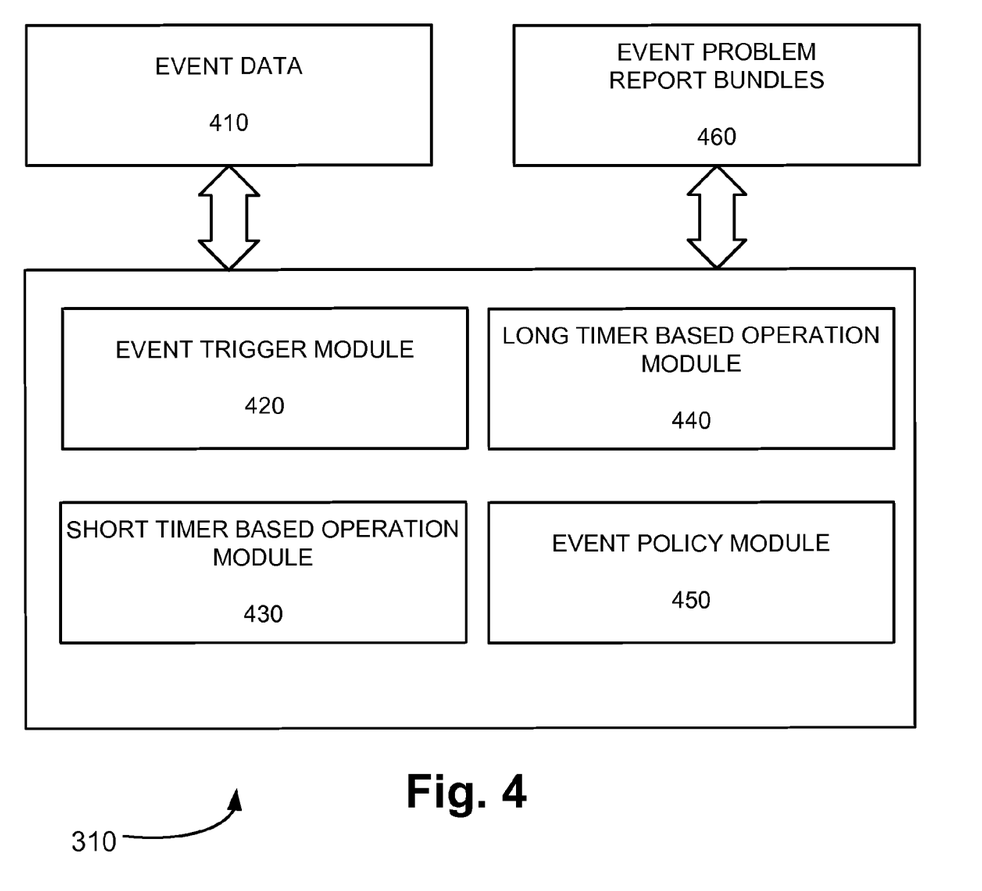
FIG. 4 is a functional block diagram of exemplary support logic of FIG. 3.

FIG. 4 shows an exemplary functional block diagram of event logic 310. As shown, event logic 310 may include an event trigger module 420, a short timer based operation module 430, a long timer based operation module 440 and an event policy module 450. Event logic 310 may transmit and receive event data 410 and event problem report bundles 460. In different implementations, event logic 310 may include fewer, additional, or different components than those illustrated in FIG. 4.

Event data 410 may include information related to events, time periods and/or the status of hardware and software contained within network element 110. For example, the components shown in FIG. 2 such as processor 210, memory 220, interfaces 230 and interconnect 240 may provide signals and information identifying certain events. For example, processor 210 may provide event data 410 including information relating to the status of internal registers becoming overloaded or unused. Similarly, the functional components shown in FIG. 3 may also provide event data 410 that may include information related to status and events. For example, routing logic 330 may provide event data 410 that may include information indicating a processing failure regarding routing information base (RIB). In other examples, event data 410 may include information related to events and/or the status of hardware and/or software contained in another network element connected to network 120.

Event trigger module 420 may include hardware and/or software that may receive a signal from event policy module 450 and invoke a script. For example, a script may include embedded event policies that may identify a hardware or software problem, collect data relating to the identified problem, perform an analysis of the collected data, perform a corrective action based on the analysis and generate an event problem report bundle 460. The analysis performed by an invoked script within event trigger module 420 may include any appropriate analysis algorithm, such as using one of a decision tree or an artificial intelligence database. The specific type of analysis performed by each script may be determined by the specific event 410 that invoked the script. For example, if event data 410 contains information that some component of network element 110 is using 90% of processor resources, a script contained in event trigger module 420 may be invoked by event policy module 450 in order to collect data and may determine what component is using the resources, what the nature of the problem is, what if any events may be correlated to this event, and/or what if any corrective actions may be taken. Event trigger module 420 may also invoke additional scripts based on the collected and analyzed data. For example, if a component is positively identified as using 90% of the resources of processor 210, an additional script may be invoked to collect data from the identified component to further determine the nature of the problem. Event trigger module 420 may also create new scripts based on the analysis or results of additional scripts. For example, if a specific hardware device is identified as potentially faulty by a previous script, a new script may be created that contains new parameters to monitor regarding the identified hardware device. Scripts invoked by event trigger module 420 may be referred to as "reactive" scripts, as these scripts may be invoked to react to a received event.

Short timer based operation module 430 may include hardware and/or software that may receive a signal from event policy module 450 and invoke a script. For example, a detected event or a short timer value that may be contained in event policy module 450 may be detected. Upon detection of an event, for example, event policy module 450 may invoke a script in short timer based operation module 430 that may include event policies that may identify a hardware or software problem, collect data relating to the identified problem, perform an analysis of the collected data, perform a corrective action based on the analysis and generate an event problem report bundle 460. The analysis performed by an invoked script within short timer based operation module 430 may include any appropriate analysis algorithm, such as using one of a decision tree or an artificial intelligence database. The specific type of analysis performed by each script may be determined by the specific event or short timer value that may have been detected. Short timer based operation module 430 may also create and send an event problem report bundle 460 based on an invoked script that may include event data 410, collected data, and corrective actions taken. A script contained in short timer based operation module 430 may invoke processes to correlate events, perform trend analysis, detect increments of critical counter values and measure or detect memory leaks, and may also invoke additional scripts based on the collected and analyzed data. For example, if a trend is positively identified by a first script, an additional script may be invoked to reconfigure component(s) within network element 110 in order to adjust to the determined trend. Short timer based operation module 430 may also create new scripts based on the analysis or results of other scripts. For example, if a specific software process is identified as potentially faulty by a previous script, a new script may be created that contains new parameters to monitor and/or shortens a time period within short timer based operation module 430 that invokes the new scripts. Scripts invoked by short timer based operation module 430 may also be referred to as "reactive" scripts, as they may be invoked to react to a timer value.

Long timer based operation module 440 may include hardware and/or software that may receive a signal from event policy module 450 and invoke a script. For example, an event or long timer value that may be contained in event policy module 450 may be detected. Upon detection of an event, for example, event policy module 450 may invoke a script contained in long timer based operation module 440 that may collect data that may be sent to another network device via a problem report bundle 460, for analysis. For example, data collected by a script invoked in long timer based operation module 440 may be analyzed to determine long term trends of network element 110. Data collected by a script invoked by long timer based operation module 440 may also be strategically analyzed to determine potential risks and/or failures that may occur within network element 110, for example. Scripts invoked in long timer based operation module 440 may be referred to as proactive scripts, as the data collected and analyzed, may be related to successful operations of network element 110, and may be used to "proactively" reconfigure hardware and/or software within network element 110 before a problem or error occurs.

Event policy module 450 may include event policies and time periods that may be used to process received event data 410 and in response to the received event, time period, etc, invoke scripts contained in modules 420-440. For example, event policy module 450 may store events and information relating to an appropriate script and or module 420-440 to invoke. After determining an appropriate script to invoke, event policy module 450 may send signals and information to the appropriate module (420-440) so that further processing of data may be performed.

Event problem report bundles 460 may include an XML document including information relating to received event data 410 and/or information relating to data collected and/or corrective actions taken by any of modules 420-440 in response to received event data 410 and/or a timing (short or long) operation. For example, after any one of modules 420-440 have collected, analyzed and processed event data 410, an event problem report bundle 460 may be generated containing information.

Figure 5:
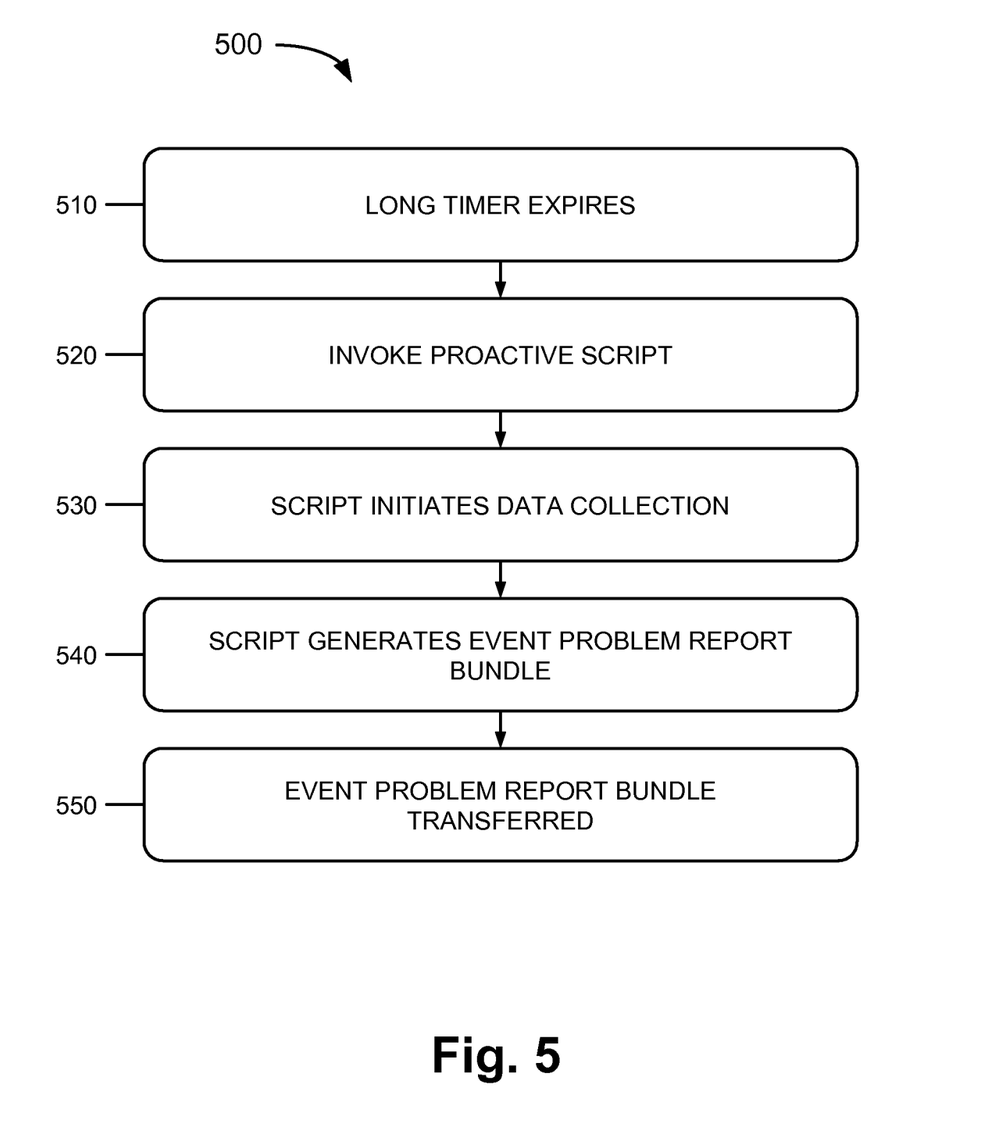
FIG. 5 is a flowchart of an exemplary proactive process.
Figure 6:
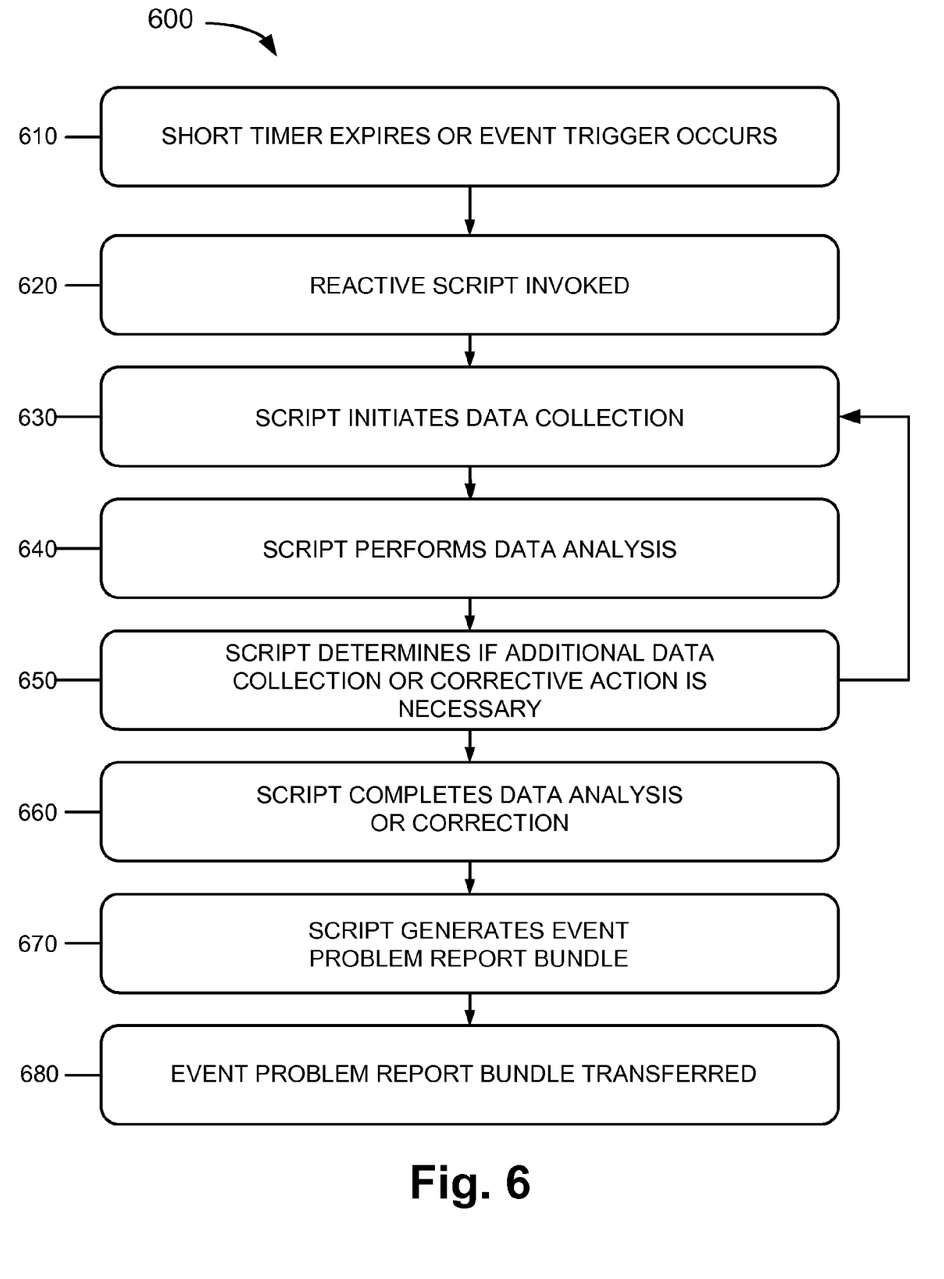
FIG. 6 is a flowchart of an exemplary reactive process.

The above paragraphs describe system elements that are related to intelligently monitoring and restoring the functionality of network element 110. The system elements shown in FIG. 4 may perform both proactive and reactive processes within network element 110. FIGS. 5-6 as described below, depict exemplary processes that are capable of being performed by network element 110.

FIG. 5 is a flowchart illustrating an exemplary proactive process 500. Process 500 may begin when a long timer value expires (block 510). For example, a timer value contained in event policy module 450 may expire. The timer values contained in event policy module 450 may be on the order of days, weeks, months, etc. Each individual timer value contained in event policy module 450 may invoke an appropriate script contained in long timer based operation module 440 upon timer expiration (block 520).

Once invoked, a proactive script may collect data (block 530). For example, a script may collect data at one of interfaces 230 or an invoked script may collect data relating to the operations of processor 210. The invoked proactive script may generate an event problem report bundle 460 (block 540). For example, an event problem report bundle 460 may be generated that contains the collected data that may relate to one of interfaces 230. An event problem report bundle 460 may then be transferred (block 550). For example, network element 110 may transmit an event problem report bundle 460 to a central network device that may further analyze the collected data. Upon analysis of the received data within a problem report bundle 460, a central network device may determine that an interface 230 is currently operating. However, the central network device may determine or flag that interface 230 may potentially fail based on, for example, analyzed data contained in other received problem report bundles from other network devices. A central network device may transmit information back to network element 110 based on the analyzed data. For example, a central network device may transmit an updated software process to be used in place of a potentially faulty software process within network element 110. A central network device may also transmit a script that may be contained and used within network element 110 based on analyzed data received from network element 110.

FIG. 6 is a flowchart illustrating an exemplary reactive process 600. Process 600 may begin when a short timer expires or an event trigger occurs (block 610). For example, a short timer value or event contained in event policy module 450 may be detected. Each short timer value and event in event policy module 450 may then invoke a script contained in short timer based operation module 430 based upon the expiration of a short timer value or detection of an event (block 620).

Once invoked, a reactive script may initiate data collection (block 630). For example, a received event 410 may invoke a reactive script contained in event trigger module 420. The received event 410 may be an event such as 50% of memory 220 is being used, that may indicate a potential memory leak. Data may be collected relating to hardware aspects of memory 220 and data may be collected relating to software processes or operations that may currently be accessing memory 220. The data collected regarding the operation of memory 220 may then be analyzed (block 640). For example, the analyzed data collected (in block 630) may indicate that hardware aspects of memory 220 are functioning properly. Other data collected (in block 630) by the invoked reactive script may relate to the amount of data stored in routing tables or forwarding tables contained in routing information base (RIB). This data may be analyzed to determine if 50% memory usage is normal based on the information in RIB.

Based on the analysis performed in block 640, the invoked script may determine if additional data collection may be necessary or if corrective action may be taken (block 650). Continuing with the above example, if the analysis of the data indicates that the network element is currently receiving large amounts of data, a 50% memory usage would be determined to be acceptable and no corrective action may be taken, (block 650), thus completing the data analysis and corrective actions (block 660).

If for example, an analysis of the data relating to the RIB indicates that a small amount of data is being received by network element 110, this may indicate that a memory leak is occurring and another reactive script may be invoked or other event scripts may be correlated to collect data relating to other processes currently accessing memory 220 (block 650). An additionally invoked reactive script may collect and analyze data and determine that a software process is not releasing memory space within memory 220. In response to this analysis, the script may shut down the detected faulty software process and launch another process to replace the faulty software (block 660).

The reactive script may then generate an event problem report bundle 460 (block 670). For example, an event problem report bundle 460 may be generated that identified the detected faulty software process within network element 110. The event problem report bundle 460 may also contain information relating to the corrective action that may have been taken in response to the detected faulty software process. Further, the reactive script may set an alarm or create another reactive script to monitor memory 220 based on the analyzed collected data obtained in blocks 630-660. The event problem report bundle 460 may then be transferred to another network device (block 680).

For example, an event problem report bundle 460 may be transferred from network element 110 to a central network device connected to network 120. For example, a central server and/or computer may store and analyze data received from a number of network devices. Receiving event problem report bundles 460 from a plurality of network elements 110 and/or other network devices, allows a central network device to detect and compensate for trends or tendencies within network elements 110 that may be unnoticed by existing systems.

In another example of blocks 610-660, an event may be received by event logic 310 indicating that a Border Gateway Protocol (BGP) has gone down. In this example, a reactive script may be invoked to collect further data relating to this event. At some time within the next thirty seconds for example, another event may be received by event logic 310 indicating that the BGP has gone back up. In this example, the two events may be correlated and the collected data may be analyzed to determine if the same device produced these events. If it is determined that the same device produced these events, it may indicate that there is a problem with the BGP on the identified device and another script may be created to further monitor the device. If, for example, 5 BGP up/down events continue to be received over the next 5 minutes by event logic 310, it may be determined and/or confirmed that a BGP problem exists, in which case further scripts, commands and/or corrective actions may be taken in response to this determination.

Continuing with this example, once invoked by a BGP up/down event policy, an invoked reactive script may contain logic and commands such as, check the installed routes on the network element 110 and check the list of interfaces on the network element 110 (router). The data collected from these commands may be correlated to identify a faulty interface and the faulty interface may be disabled. After this corrective action has been taken, blocks 670 and 680 may be enacted to create and transmit an event problem report bundle 460 to an external network device. It should be understood that the above examples are exemplary only, and that each specifically identified event may invoke a specific script may include specific event polices and data collection and analysis of specific parameters used to determine and/or correct errors that generated the specific event.

Figure 7:
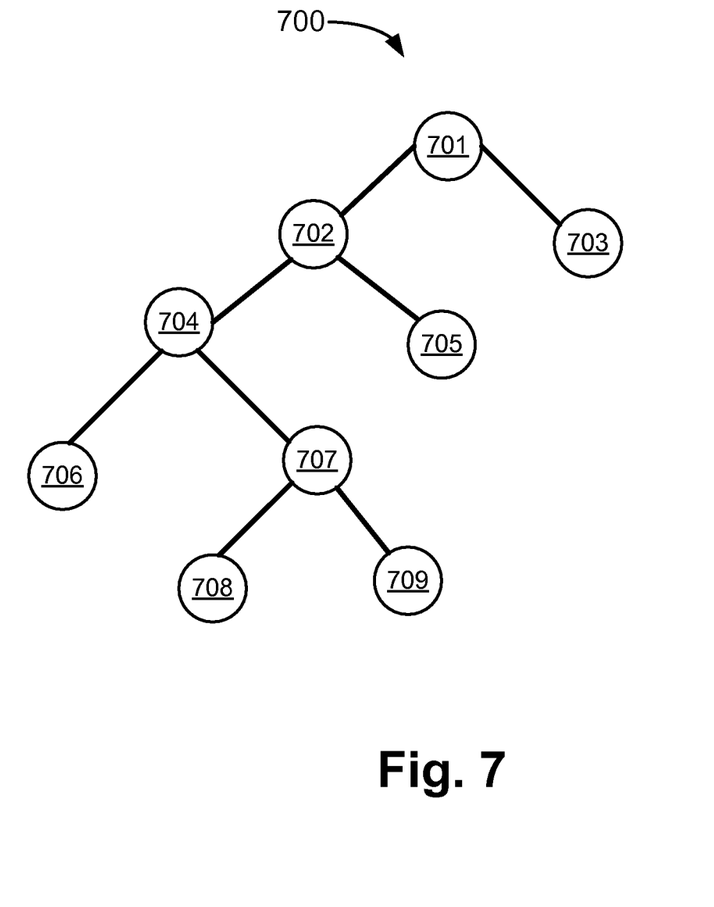
FIG. 7 is an exemplary decision tree.

FIG. 7 shows an exemplary decision tree 700. As shown, decision tree 700 includes a number of nodes 701-709, where each node may represent a logical decision point within a process (such as a process contained in a script). The process of collecting and analyzing data, correlating events and performing corrective actions based on the analyzed data within decision tree 700, may be equivalent to the process performed in blocks 630-660, as described above.

The process of traversing exemplary decision tree 700 may begin when a short timer value has expired and an invoked script collects data related to memory utilization within network element 110, for example. A decision may be made at node 701 to analyze the collected data and determine if memory utilization has changed (more than a threshold value) with respect to previously collected data. Based on this comparison made at node 701, if the memory utilization data has changed more than a threshold amount, the process may continue at node 702, and if there is no change in the memory utilization data, the process may continue at node 703. If there is no change, a decision may be made at node 703 to reset the short time period and take no further action. If the process continues at node 702, an analysis of the memory utilization data may be performed to determine if the change in memory utilization was an increase or a decrease. If the analyzed data indicates a decrease in memory utilization, the process may continue at node 705. An analysis of the data made at node 705 may determine that memory utilization has steadily decreased and a trend may be detected. In response to this determination, a new script may be created that adjusts memory utilization threshold parameters, for example.

If the analyzed data at node 702 indicates an increase in memory utilization, the process may continue at node 704. At node 704 data may be collected from the RIB to determine if the high memory utilization is due to a routing churn. If the data collected from RIB indicates that a routing churn is occurring, the process may end at node 706, where no further action is taken. If the data collected from RIB indicates that a routing churn is not occurring, the process may continue at node 707. Data may be collected by invoking additional scripts at node 707 to determine which tasks are using memory. Additionally, other detected events that have invoked scripts relating to memory usage may be correlated. In this example, a correlated event may also be associated with another decision tree (not shown), where data and results of this correlated decision tree may be employed into decision tree 700, for example. Based on the analyzed and correlated data, it may be determined at node 707 that a specific software process is causing memory fragmentation problems within network element 110. In this instance, the process may continue at node 709. It may then be determined at node 709 to invoke a memory de- fragmentation algorithm in order to reduce memory utilization. If it is determined at node 707 that a memory fragmentation is not occurring, it may be determined that a potential memory leak is occurring, where the process may continue at node 708. A corrective action may be taken at node 708 to reconfigure a hardware or software process in order to determine if the potential memory leak may be stopped. Additional scripts may be invoked in order to collect data to determine which (if any) software processes may be causing the potential memory leak. Other corrective actions taken at node 708 may include sending an alarm and/or generating and transmitting an event problem report bundle 460. As described above the event problem report bundle 460 may include information indicating that a memory leak has been detected that may include information relating to corrective actions taken and/or information requesting a new software process to replace the faulty process. It should be understood that decision tree 700 is exemplary only, and that each specific script may include a specific decision tree based on analyzing parameters used to make decisions based on the detected event or time period.

As described above, the present embodiments allow for errors or events within a network element 110 to potentially be avoided, by collecting and analyzing data before errors occur using proactive scripts. Further, if an error or event is detected with network element 110, the error or event may be intelligently corrected without operator intervention.

The foregoing description of implementations provides an illustration, but is not intended to be exhaustive or to limit the implementations to the precise form disclosed. Modifications and variations are possible in light of the above teachings or may be acquired from practice of the teachings.

In addition, while series of blocks have been described with regard to the processes illustrated in FIGS. 5-6, the order of the blocks may be modified in other implementations. Further, non-dependent blocks may represent blocks that can be performed in parallel. For example, blocks 510-550 that are performed for one interface may be independent of blocks 510-550 for a second interface and, therefore, may be performed in parallel to blocks 510-550 for the second interface. Further, it may be possible to omit blocks within a process.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
   a processor to:
   invoke proactive programs based on an expiration of a first time period within the network device, where the proactive programs collect and transmit data relating to successful operations of the network device;
   invoke reactive programs, based on a detection of at least one of an event or expiration of a second time period, the second time period being less than the first time period, where the reactive programs collect and analyze data relating to the detected event or the expiration of the second time period;
   determine a difference between the analyzed data relating to the successful operations and the collected and analyzed data relating to the detected event or the expiration of the second time period;
   determine a corrective action based on the analyzed data relating to the successful operations and the collected and analyzed data relating to the detected event or expiration of the second time period; and
   perform the determined corrective action within the network device.

2. The network device of claim 1, where the reactive programs analyze data using an analysis algorithm based on at least one of a decision tree or an artificial intelligence database.

3. The network device of claim 2, where the determined corrective action includes at least one of reconfiguring a hardware device or invoking a software process.

4. The network device of claim 2, where the processor is further configured to:
   invoke additional reactive programs based on the results of the at least one of a decision tree or an artificial intelligence database.

5. The network device of claim 1, where the processor is further configured to:
   generate report data including the collected and analyzed data relating to the successful operations, the collected and analyzed data relating to the detected event or the expiration of the second time period, and the determined corrective action.

6. The network device of claim 5, where the processor is further configured to:
   transmit the report data to another network device.

7. A method comprising:
   invoking a proactive program based on an expiration of a first time period, where the proactive program collects and transmits data relating to successful operations of a network device;
   invoking a reactive program, based on detection of at least one of an event or expiration of a second time period, the second time period being shorter than the first time period, where the reactive program collects and analyzes data relating to the detected event or the expiration of the second time period;
   collecting the data relating to the successful operations of the network device and the data relating to the detected event or the expiration of the second time period using the invoked programs;
   analyzing the collected data relating to the successful operations of the network device and the collected data relating to the detected event or the expiration of the second time period to determine a corrective action; and
   performing the determined corrective action within the network device.

8. The method of claim 7, where analyzing the collected data to determine the corrective action includes:
   determining the corrective action using a decision tree.

9. The method of claim 8, where determining the corrective action using the decision tree includes:
   collecting, using the decision tree, data from more than one hardware device or software process, and
   using the collected data to determine the corrective action.

10. The method of claim 9, where the corrective action associated with the decision tree includes at least one of reconfiguring one of the hardware devices, reconfiguring one of the software processes, or taking no action.

11. The method of claim 7, further comprising:
    generating a report that includes information identifying a hardware device or software process, data related to the identified hardware device or software process, and the determined corrective action.

12. The method of claim 7, further comprising:
    transmitting the generated report.

13. A network device comprising:
    a processor to:
    determine an expiration of a plurality of time periods within the network device;
    invoke a proactive program that collects first data relating to successful operations of the network device in response to expiration of a first of the plurality of time periods;

invoke a reactive program, based on a detection of at least one of an event or expiration of a second of the plurality of time periods, the second time period being shorter than the first time period, where the reactive program collects and analyzes second data in response to the detection of the detected event or the expiration of the second time period;

collect data using the invoked proactive and reactive programs;

analyze the collected first and second data; and perform corrective actions within the network device based on the analyzed first and second data.

14. The network device of claim 13, where, when analyzing the collected first and second data, the processor is further configured to:

invoke additional programs based on results of a decision tree or an artificial intelligence database.

15. The network device of claim 14, where, when analyzing the collected first and second data, the processor is further configured to:

analyze data collected from more than one of the additional programs.

16. The network device of claim 13, where, when analyzing the collected first and second data, the processor is further configured to:

create a new program based on the analysis of the collected first and second data.

17. The network device of claim 13, where, when performing the corrective actions, the processor is further configured to:

reconfigure a software process or a hardware device within the network device.

18. The network device of claim 13, where the processor is further configured to:

create and transmit an event problem report bundle, where the event problem report bundle includes information related to an event associated with the network device.

19. The network device of claim 18, where the information related to the event includes:

data collected by a program invoked by the event, an analysis of the event, and corrective actions taken in response to the event.

* * * * *

UNITED STATES PATENT AND TRADEMARK OFFICE
CERTIFICATE OF CORRECTION

PATENT NO. : 8,433,667 B2
APPLICATION NO. : 11/840520
DATED : April 30, 2013
INVENTOR(S) : Pallavi Mahajan et al.

Page 1 of 1

It is certified that error appears in the above-identified patent and that said Letters Patent is hereby corrected as shown below:

In the Claims:

Column 9, claim 1, line 54 should read: "determine a difference between the data relat-"

Column 9, claim 1, line 58 should read: "determine a corrective action based on the data"

Column 11, claim 13, line 6 should read: "response to the detection of the event or the"

Column 11, claim 13, line 8 should read: "collect the first and second data using the invoked proactive and reactive"

Signed and Sealed this
Ninth Day of July, 2013

Teresa Stanek Rea
*Acting Director of the United States Patent and Trademark Office*